United States Patent
Chen et al.

(10) Patent No.: US 8,162,512 B2
(45) Date of Patent: Apr. 24, 2012

(54) OPTICAL SHEET, MANUFACTURING METHOD THEREOF, AND BACKLIGHT ASSEMBLY USING THE SAME

(75) Inventors: Yan-Zuo Chen, Taoyuan County (TW); Wen-Feng Cheng, Taoyuan County (TW); Li-Ping Cho, Taoyuan County (TW)

(73) Assignee: Entire Technology Co., Ltd., Taoyuan County (TW)

( * ) Notice: Subject to any disclaimer, the term of this patent is extended or adjusted under 35 U.S.C. 154(b) by 446 days.

(21) Appl. No.: 12/556,881

(22) Filed: Sep. 10, 2009

(65) Prior Publication Data
US 2011/0058354 A1    Mar. 10, 2011

(51) Int. Cl.
*F21V 5/00* (2006.01)
(52) U.S. Cl. ....... 362/309; 362/97.1; 362/617; 362/607; 362/328; 362/308
(58) Field of Classification Search ........ 362/97.1–97.4, 362/606, 607, 615–629, 307–309, 327–330, 362/333, 335–338, 223–225; 359/742; 264/1.1, 264/1.24, 2.5
See application file for complete search history.

(56) References Cited

U.S. PATENT DOCUMENTS

| | | | |
|---|---|---|---|
| 6,527,410 B2 * | 3/2003 | Yamaguchi | 362/243 |
| 6,788,460 B2 * | 9/2004 | Knox et al. | 359/456 |
| 6,822,707 B2 * | 11/2004 | Ariyoshi et al. | 349/112 |
| 6,876,408 B2 * | 4/2005 | Yamaguchi | 349/57 |
| 6,897,911 B2 * | 5/2005 | Yamaguchi | 349/57 |
| 7,182,481 B2 * | 2/2007 | Shimura | 362/244 |
| 7,309,149 B2 * | 12/2007 | Lee et al. | 362/339 |
| 7,374,328 B2 * | 5/2008 | Kuroda et al. | 362/620 |
| 7,527,410 B2 * | 5/2009 | Yoshizawa et al. | 362/615 |
| 7,618,179 B2 * | 11/2009 | Miyashita | 362/609 |
| 7,954,983 B2 * | 6/2011 | Chen et al. | 362/309 |

FOREIGN PATENT DOCUMENTS
TW    I264596    7/1992
* cited by examiner

*Primary Examiner* — Bao Q Truong
(74) *Attorney, Agent, or Firm* — McGinn IP Law Group, PLLC

(57) ABSTRACT

An optical sheet receiving an incident light from a light source is provided. The optical sheet includes a body, a plurality of reflective structures, and a plurality of Fresnel lens units. The body includes an incident surface and an emergent surface. The incident surface receives the incident light with an incident angle. The refractive index of the body is $n_i$ and i is a positive integer. The reflective structures are placed on the body. There is a spacing W between two neighboring reflective structures. In the direction of the incident light, the thickness of the reflective structure is t. The Fresnel lens units, having a width P, are disposed on the emergent surface. Each Fresnel lens is corresponded to the spacing. When the equation, $$\tan^{-1}\left[\frac{P^2}{6t}\right] > \sin^{-1}\sum_{i=1}^{j}\frac{1}{n_i},\ j \geq 1,$$

is satisfied, the incident light passes through the spacing, the incident angle is adjusted by the thickness t and converged by the Fresnel lens units.

17 Claims, 11 Drawing Sheets

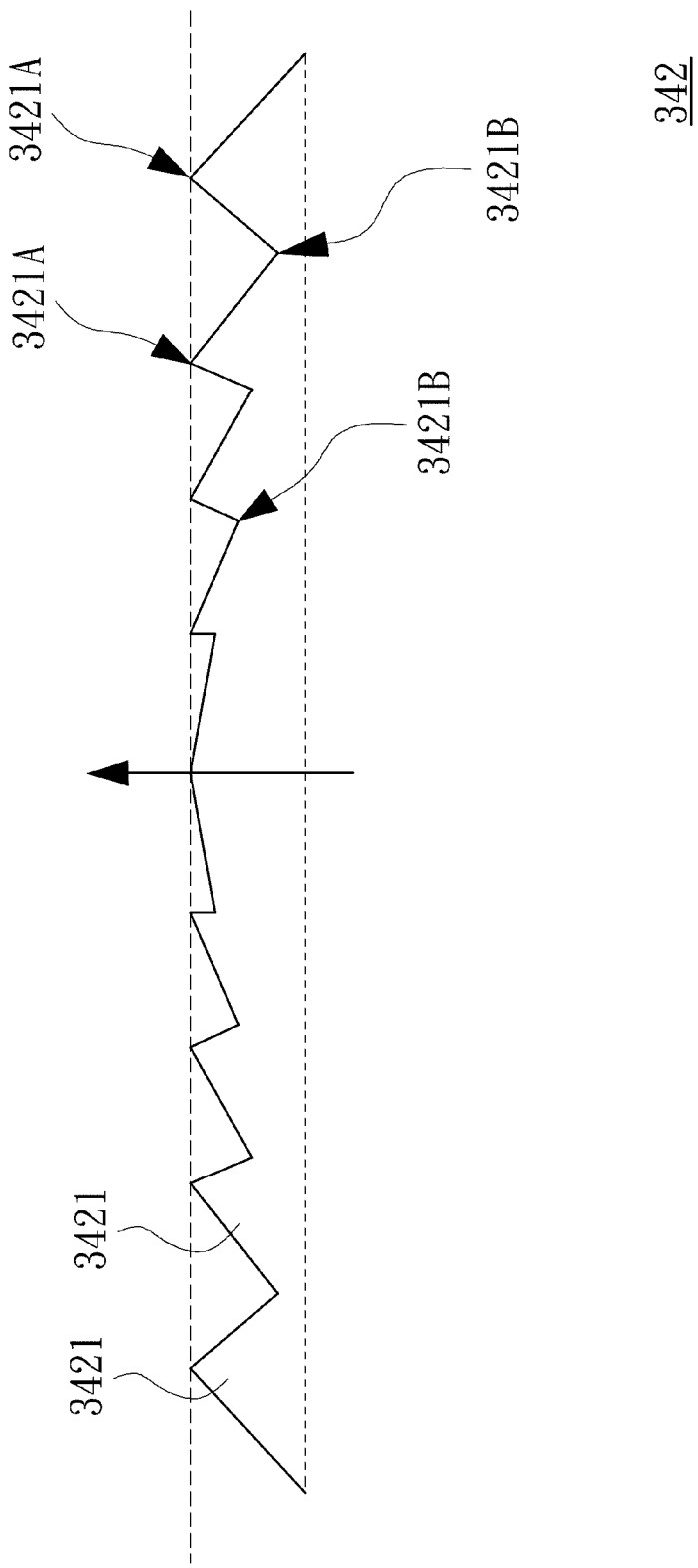

OPTICAL SHEET, MANUFACTURING METHOD THEREOF, AND BACKLIGHT ASSEMBLY USING THE SAME

BACKGROUND OF THE INVENTION

1. Field of the Invention

The present invention relates to an optical sheet and particularly to an optical sheet that can converge the incident light, manufacturing method thereof, and the backlight assembly using the same.

2. Description of the Prior Art

The large size LCD is usually equipped with direct-type backlight assembly. In the direct-type backlight assembly, the light sources are placed under the optical sheet. Please refer to FIG. 1, FIG. 1 shows the backlight assembly in Taiwan patent 1264596. The direct-type backlight assembly 1 includes a frame 11, a light source 12, a lamp cover 13, and a Fresnel lens 14. As shown in FIG. 1, after emitting from the light source 12, one part of light will enter the Fresnel lens 14 directly, and another part of light will be reflected to the Fresnel lens 14 by the lamp cover 13. After passing the Fresnel lens 14, the light will become parallel light. However, the Fresnel lens 14 applied in the direct-type backlight assembly 1 can't select the light according to the incident angle and passage of light, the energy emitting from the light source 12 can't be fully utilized.

Therefore, how to utilize the energy from light source efficiently by redesigning the Fresnel lens is an issue remained to be resolved in the industry.

SUMMARY OF THE INVENTION

The primary object of the invention is to provide an optical sheet with of Fresnel lens units for utilizing efficiently the energy from light source.

To achieve the foregoing objects, an optical sheet, receiving an incident light from optical sources, is provided. The optical sheet includes a body, a plurality of reflective structures, and a plurality of Fresnel lens units. The body includes an incident surface and an emergent surface. The incident surface receives the incident light with an incident angle. The refractive index of the body is ni and i is a positive integer. The reflective structures are placed on the body. There is a spacing W between two neighboring reflective structures. In the direction of the incident light, the thickness of the reflective structure is t. The Fresnel lens units, having a width P, is disposed on the emergent surface. Each Fresnel lens is corresponded to the spacing. When the equation, $$\tan^{-1}\left[\frac{P^2}{6t}\right] > \sin^{-1}\sum_{i=1}^{j}\frac{1}{n_i}, j \geq 1,$$

is satisfied, the incident light passes through the spacing, the incident angle is adjusted by the thickness t and converged by the Fresnel lens units.

In the above optical sheet, the body is made of one of or made by stacking at least two of the following materials: polyethylene terephthalate, polycarbonate, tri-acetyl cellulose, polymethylmethacrylate, methylmethacrylate styrene, polystyrene, and cyclic olefin copolymer.

In the above optical sheet, each Fresnel lens unit further includes a plurality of Fresnel lens bodies. Each Fresnel lens body has a first end and a second end. The second end is between two neighboring Fresnel lens bodies. The second ends are arranged in a line and the heights of the two neighboring second ends are different.

In the above optical sheet, the ratio of the spacing W and the width P is between 0.2 and 0.5.

In the above optical sheet, there is a distance T between the incident surface and the emergent surface. Furthermore, the ratio of the distance T and the width P is between 0.8 and 1.2.

In the above optical sheet, the material of the reflective structure is titania, silica, or magnesia.

To achieve the foregoing objects, a manufacturing method of the optical sheet is provided. The manufacturing method includes the following steps. First, a transparent base with an upper surface and a under surface, a curing adhesive, a mold, and a plurality of reflective structures are provided. The mold can be a roller or a plane-type mold. The curing adhesive is UV curable resin or thermal-plastic resin. Then, the curing adhesive is coated on the upper surface. A plurality of the patterns is transferred into the curing adhesive in order to generate pluralities of Fresnel lenses. Finally, the reflective structures are combined on the under surface.

In the above manufacturing method of an optical sheet, the curing adhesive is UV curable resin or thermal-plastic resin.

To achieve the foregoing objects, another manufacturing method of the optical sheet will be described as follows. The manufacturing method includes the following steps. First, a transparent base with a upper surface and a under surface, a mold, and a plurality of reflective structures are provided. A plurality of the patterns is transferred into the transparent base in order to generate pluralities of Fresnel lenses on the upper surface of the transparent base. Finally, the reflective structures are combined on the under surface of the transparent base.

In the above manufacturing method of an optical sheet, the material of the transparent base is made of one of or made by stacking at least two of the following materials: polyethylene terephthalate, polycarbonate, tri-acetyl cellulose, polymethylmethacrylate, methylmethacrylate styrene, polystyrene, and cyclic olefin copolymer.

In the above manufacturing method of an optical sheet, the mold is a roller or a plate-type mold.

In the above manufacturing method of an optical sheet, the method of combining the reflective structures is bonding method and screen printing method.

To achieve the foregoing objects, a backlight assembly is provided. The backlight assembly includes a plurality of light sources, an optical sheet, and an optical film. The light sources generate the incident light. The optical sheet, receiving the incident light, includes a body, a plurality of reflective structures, and a plurality of Fresnel lens units. The body includes an incident surface and an emergent surface. The incident surface receives the incident light with an incident angle. The refractive index of the body is ni and i is a positive integer. The reflective structures are placed on the body. There is a spacing W between two neighboring reflective structures. In the direction of the incident light, the thickness of the reflective structure is t. The Fresnel lens units, having a width P, is disposed on the emergent surface. Each Fresnel lens is corresponded to the spacing. When the equation, $$\tan^{-1}\left[\frac{P^2}{6t}\right] > \sin^{-1}\sum_{i=1}^{j}\frac{1}{n_i}, j \geq 1,$$

is satisfied, the incident light passes through the spacing, the incident angle is adjusted by the thickness t and converged by the Fresnel lens units. The optical film, comparing to the optical source, is placed on the other side of the optical sheet and used for adjusting the passage of the incident light.

In the above backlight assembly, the light source is a cold cathode fluorescent lamp, a light-emitting diode, a flat fluorescent lamp, an external electrode fluorescent lamp, or a hot cathode fluorescent lamp.

Therefore, the optical sheet and the backlight assembly can provide larger intensity of light and better collimated ability.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 3B shows the second embodiment of the Fresnel lens units of the optical sheet in the invention;

DESCRIPTION OF THE PREFERRED EMBODIMENTS

Figure 1:
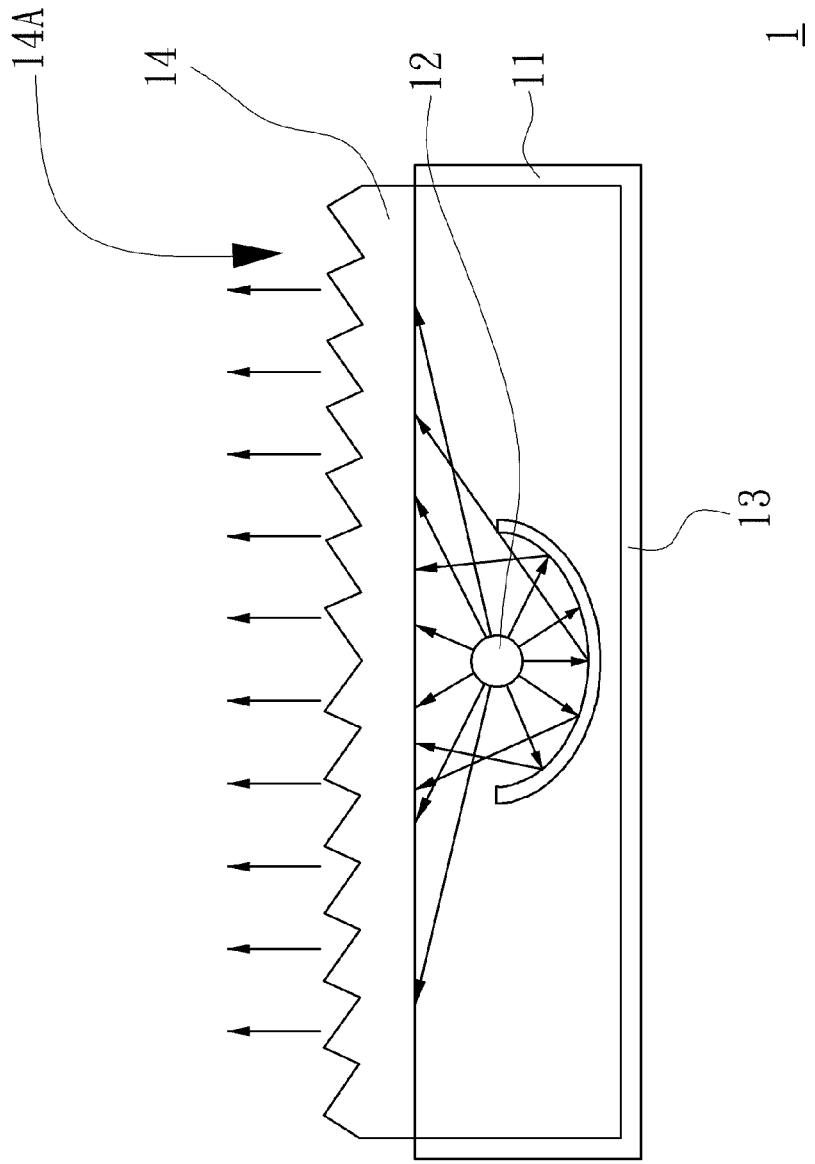
FIG. 1 shows the backlight assembly in Taiwan patent 1264596.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

Figure 2:
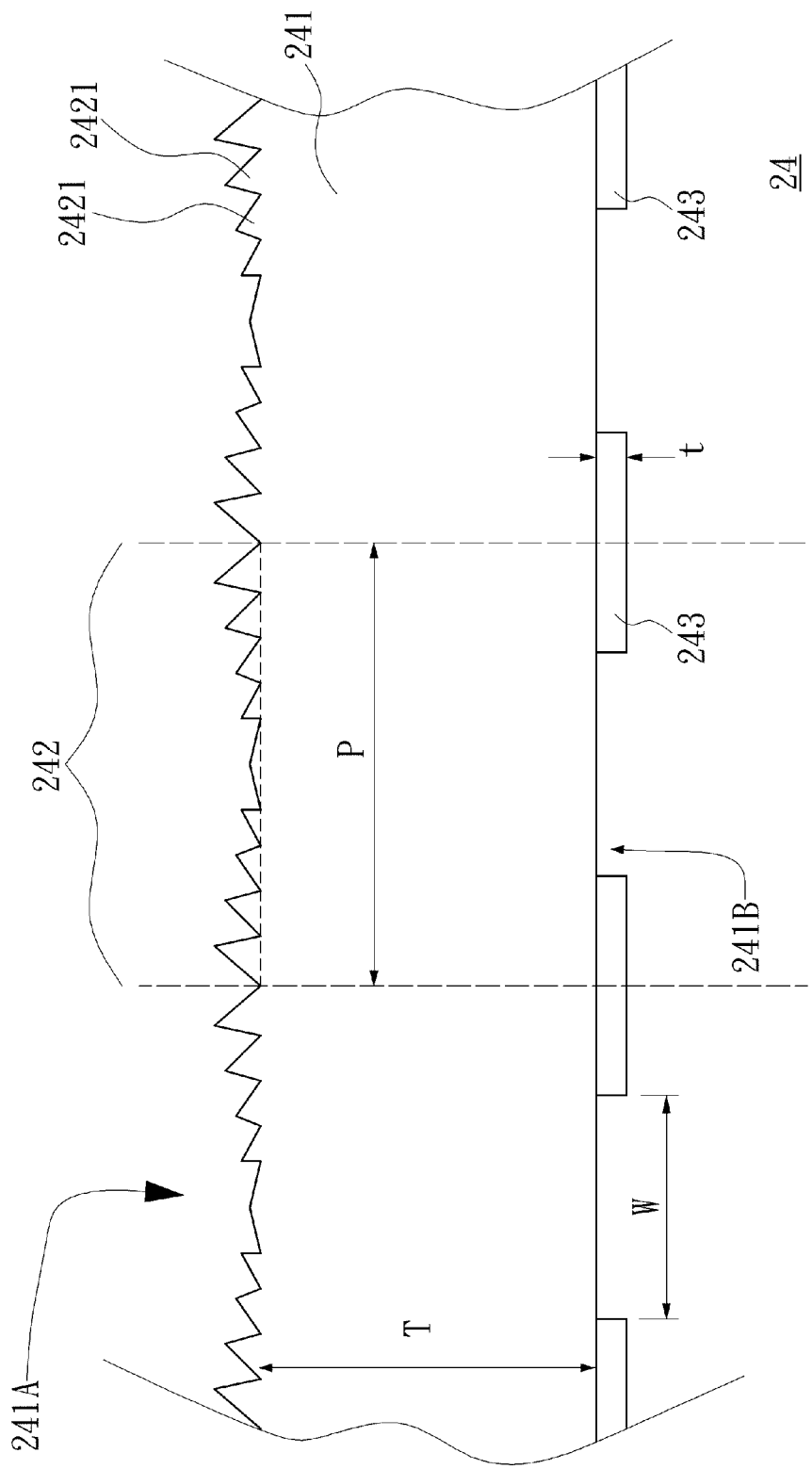
FIG. 2 shows the embodiment of an optical sheet in the invention.

Please refer to FIG. 2, FIG. 2 shows the embodiment of an optical sheet in the invention. The optical sheet 24 is used for receiving the incident light and condensing the light by changing the passage thereof. The optical sheet 24 comprises a body 24, a plurality of Fresnel Lens units 241, and a plurality of the reflective structures 243. The body 241 includes an incident surface 241B and an emergent surface 241A. The incident surface 241B is used for receiving the incident light with an incident angle. The refractive index of the body is $n_i$, and i is a positive integer. The body 241 can be made of a single material (i=1) or made by stacking at least two materials (i=1) with different refractive index ni. For example, the material of the body 241 is polyethylene terephthalate, polycarbonate, tri-acetyl cellulose, polymethylmethacrylate, methylmethacrylate styrene, polystyrene, and cyclic olefin copolymer. The Fresnel Lens units 242 are disposed on the emergent surface 241A for converging the incident light. All of the Fresnel Lens units 242 have same outline. By associating pluralities of the Fresnel Lenses 241, the optical sheets can be applied in large size LCD. The material of the reflective structures is titania, silica, or magnesia. The reflective structures are placed on the incident surface 241B of the body 241. There is a spacing W between two neighboring reflective structures 243. Each reflective structure 243 has a thickness t in the incident direction of incident light. There is a distance T between the emergent surface 241A and the incident surface 241B. The width of the Fresnel Lens 241 in the span direction of the body 241 is defined as P. Some part of the light will be reflected by the reflective structures 243 and another part of the light will passes through the spacing W between two neighboring reflective structures 243. The incident angle of the incident light can be controlled by adjusting the thickness t of the reflective structures 243. The incident light can be converged by the Fresnel lens units 242. When the equation, $$\tan^{-1}\left[\frac{P^2}{6t}\right] > \sin^{-1}\sum_{i=1}^{j}\frac{1}{n_i}, j \geq 1,$$

is satisfied, a uniform brightness can be achieved in vertical view and horizontal view.

Figure 3A:
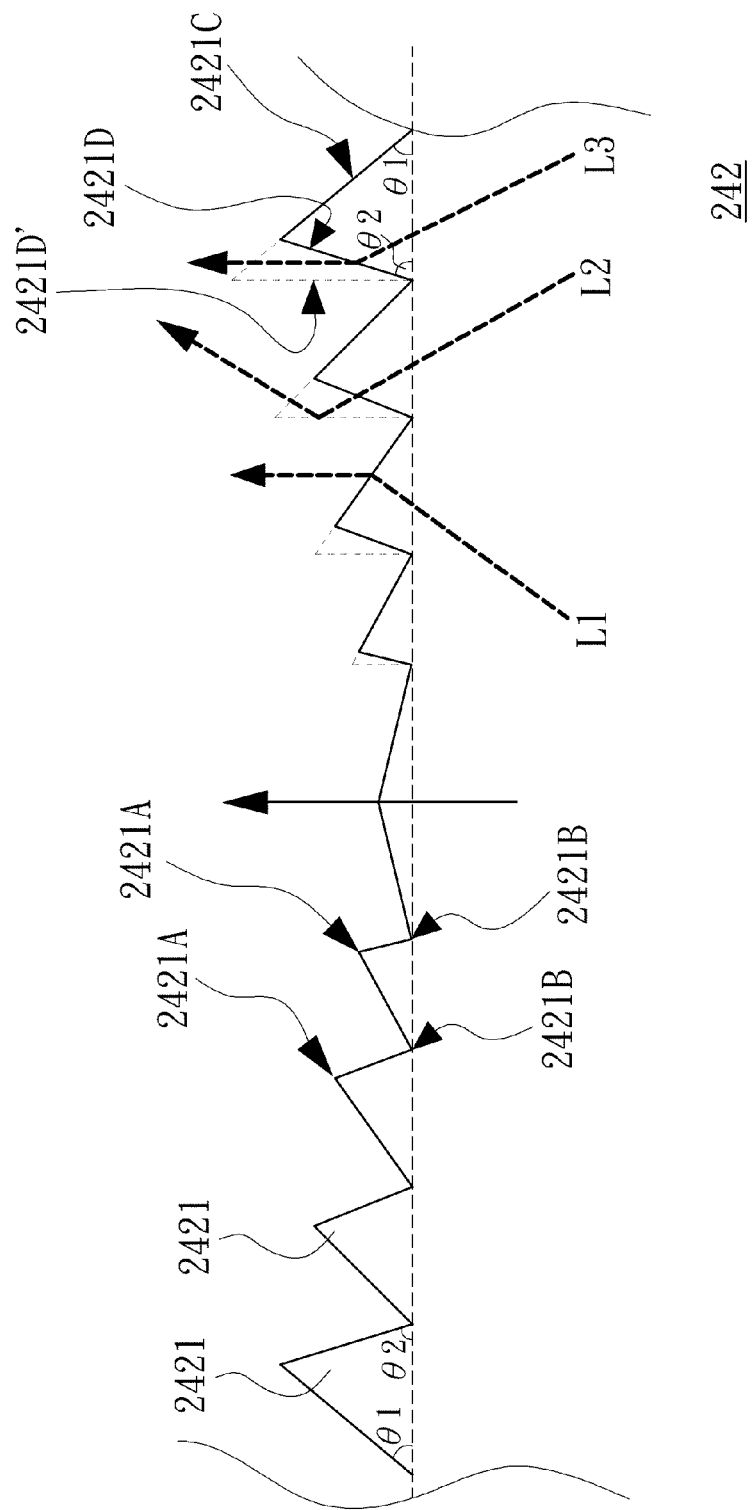
FIG. 3A shows the first embodiment of the Fresnel lens units of the optical sheet in this invention.

In order to let the skill in the art more understand the technical features of the optical sheet in the invention, the structure and principle of the Fresnel lens units will be described detailed in the following. Please refer to FIG. 2 and FIG. 3A, FIG. 3A shows the first embodiment of the Fresnel lens units of the optical sheet in this invention. As shown in FIG. 3A, for converging the light, the Fresnel lens unit 242 is similar to the ordinary convex lens. Comparing to the ordinary convex lens, the Fresnel lens is thinner and lighter. The Fresnel lens unit 242 comprises a plurality of the Fresnel lens bodies 2421. Each Fresnel lens body 2421 has different outline. The Fresnel lens body 2421 has a first end 2421A and a second end 2421B. The second end 2421B is between two neighboring Fresnel lens bodies 2421. The second ends 2421B are arranged in a line. The height of the two neighboring second ends is different. The Fresnel lens body 2421 has a first refractive surface 2421C and a second refractive surface 2421D. A first angle θ1 is between the first refractive surface 2421C and the horizontal line. A second angle θ2 is between the second refractive surface 2421D and the horizontal line. The first refractive surface 2421C is used to refract the light L1 to emit from emergent surface 241A directly. The first refractive surface 2421C is made as a plane-type surface for the convenience of the manufacture. However, the skill in the art can make the first refractive surface 2421C as a curve surface. The second refractive surface 2421D' of traditional Fresnel lens is shown as a vertical dotted line in FIG. 3A. For saving the material, the second refractive surface 2421D is made inclined and shown as a continuous line. Because large incident angle, the incident light L2 will be reflected by the second refractive surface 2421D' and not emitted from emergent surface 241A. Therefore, some energy of light will be lost. However, the incident light L3 with same direction will be refracted by the second refractive surface 2421D and emitted from the emergent surface 2421D. Therefore, the energy of light will be used fully. Each Fresnel lens body 2421 has different outline, so the first angle θ1 will be varied in the different position.

Said optical sheet can enhance the intensity of emergent light and improve the performance of optical sheet. In order to prove the performance of the optical sheet, the inventor takes several simulations as follows.

Figure 5:
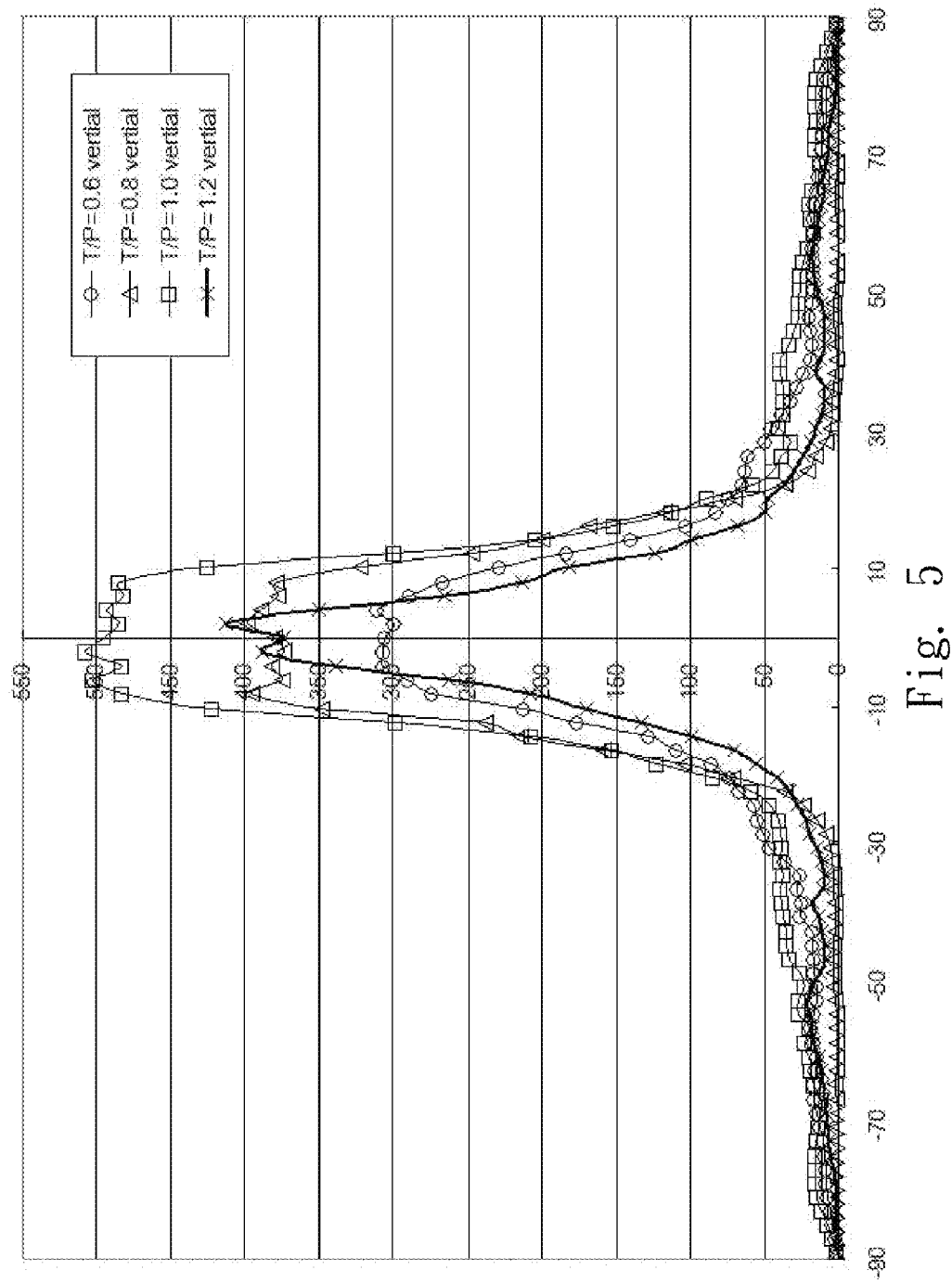
FIG. 5 shows the optical performance of the optical sheet with different T/P value.

Please refer to FIG. 5, FIG. 5 shows the optical performance of the optical sheet with different T/P value. The abscissa represents the angle of view between −90 and 90 degree. The ordinate represents the intensity of light. When T/P value is 0.6, the intensity of light is 300 lux. When T/P value is between 0.6 and 1.2, the intensity of light is above 375 lux. When T/P value is 1.0, the intensity of light is above 500 lux. Therefore, from this simulation, the preferred range of T/P value is between 0.8 and 1.0.

Figure 6:
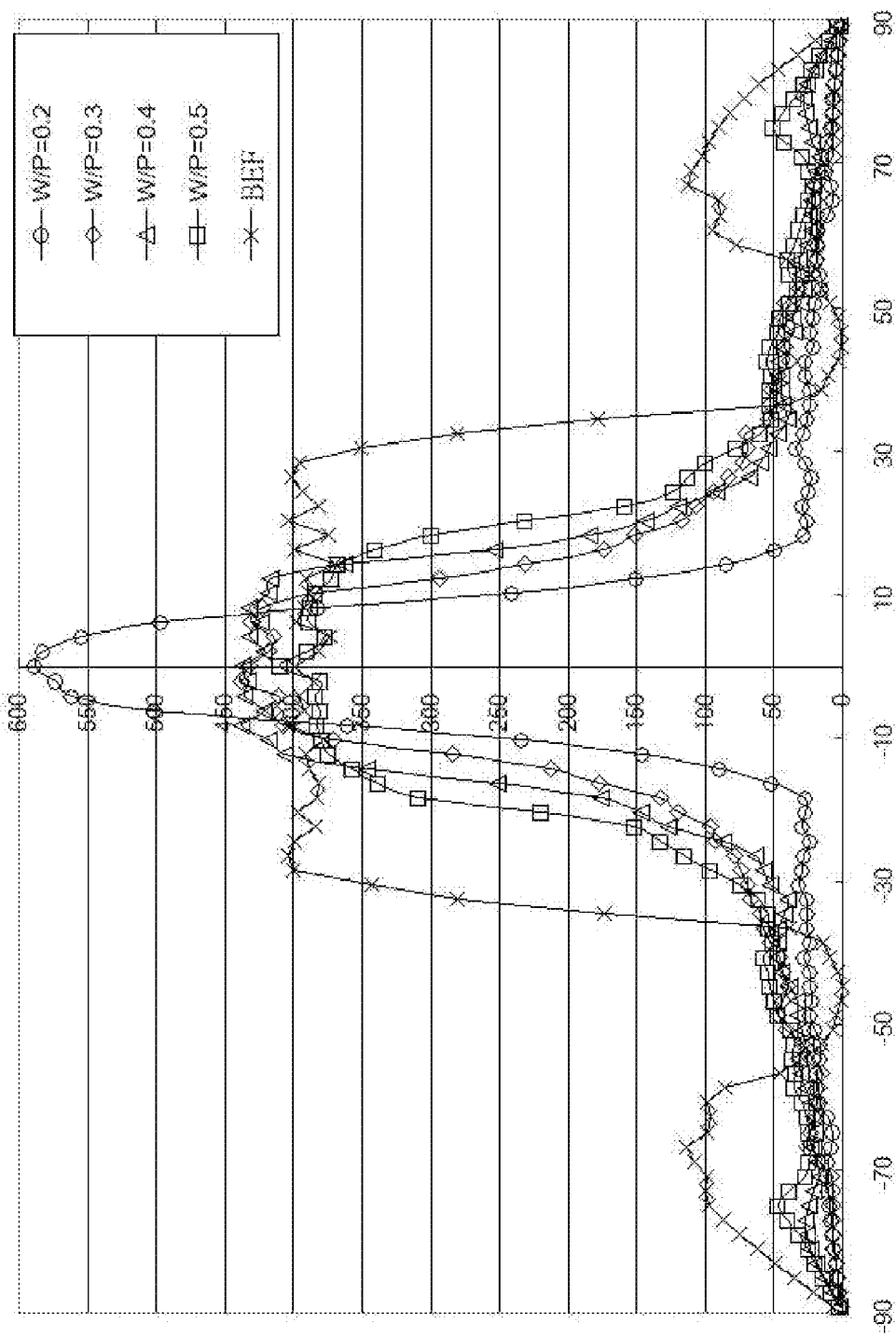
FIG. 6 shows the optical performance of the optical sheet with different opening ratio W/P.

Please refer to FIG. 6, FIG. 6 shows the optical performance of the optical sheet with different opening ratio W/P. The abscissa represents the angle of view between −90 and 90 degree. The ordinate represents the intensity of light. As shown in FIG. 6, the intensity of light from the brightness enhancement film (BEF) is less than 400 lux. However, when the W/P value is between 0.2 and 0.5, the intensity of light from the optical sheet in this invention is between 400 and 450 lux, higher than the brightness enhancement film. When the W/P value is 0.2, the intensity of light is 600 lux. Therefore, the preferred range of W/P value is between 0.3 and 0.4.

Figure 7:
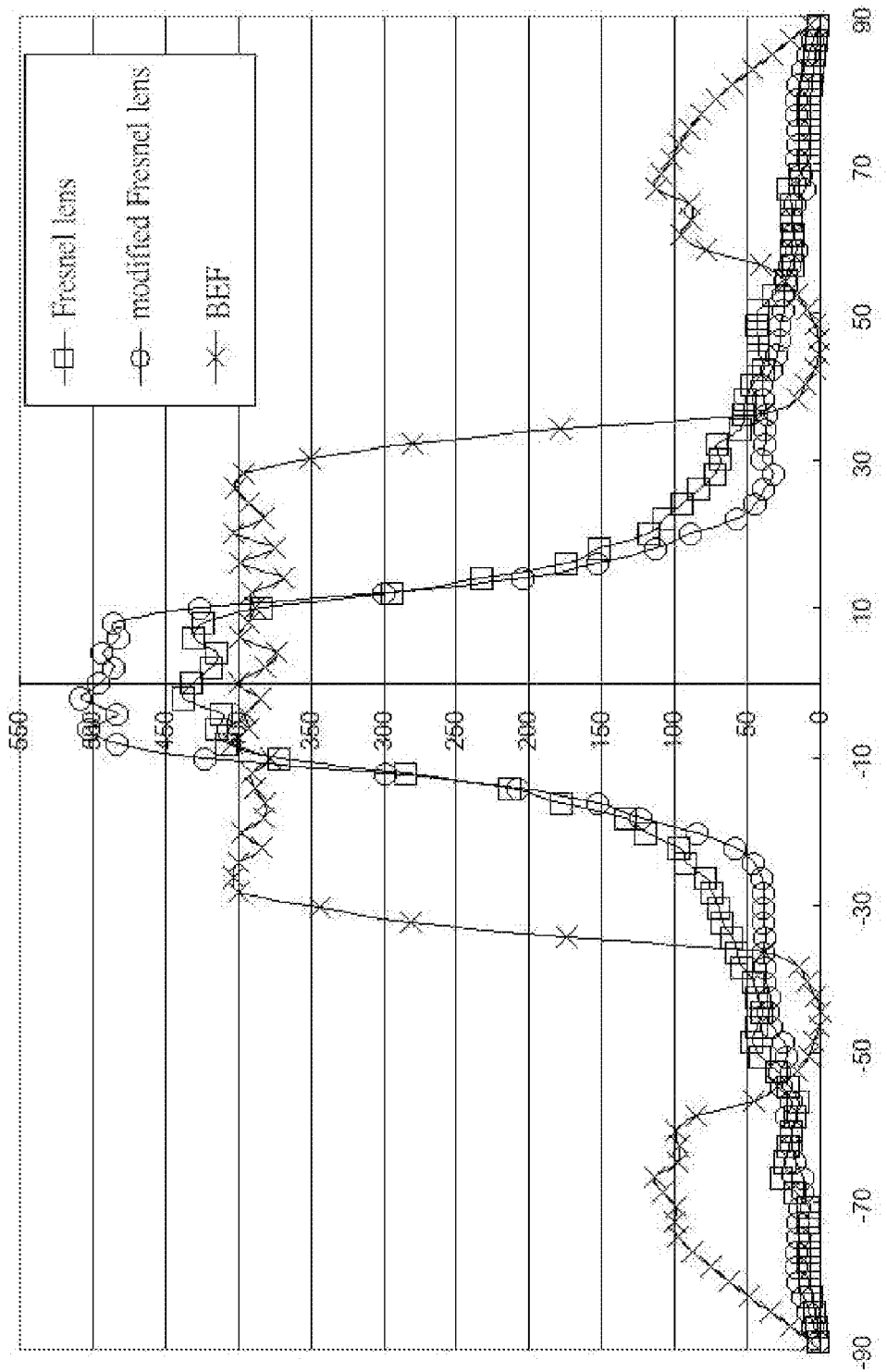
FIG. 7 shows the optical performance differences between optical sheet with Fresnel lens and the brightness enhancement film.

Please refer to FIG. 7, FIG. 7 shows the optical performance differences between optical sheet with Fresnel lens and the brightness enhancement film. In FIG. 7, the Fresnel lens curve represents the simulation result of the optical sheet with the vertical second refractive surface, and the modified Fresnel lens curve represents the simulation result of the optical sheet with the inclined second refractive surface. As shown in FIG. 7, the intensity of light from the brightness enhancement film (BEF) is less than 400 lux. The optical sheet with the Fresnel lens has higher intensity. Furthermore, the optical sheet with the inclined second refractive surface can achieve 600 lux. From this simulation, the skill in the art can understand the collimated ability of the optical sheet with Fresnel lens is 10~30% higher than the brightness enhancement film.

The incident angle of the incident light can be adjusted by the thickness t of the reflective structure. The equation $$\tan^{-1}\left[\frac{P^2}{6t}\right] > \sin^{-1}\sum_{i=1}^{j}\frac{1}{n_i}, j \geq 1,$$

can be used to limit the structural features of the optical sheet.

Figure 8:
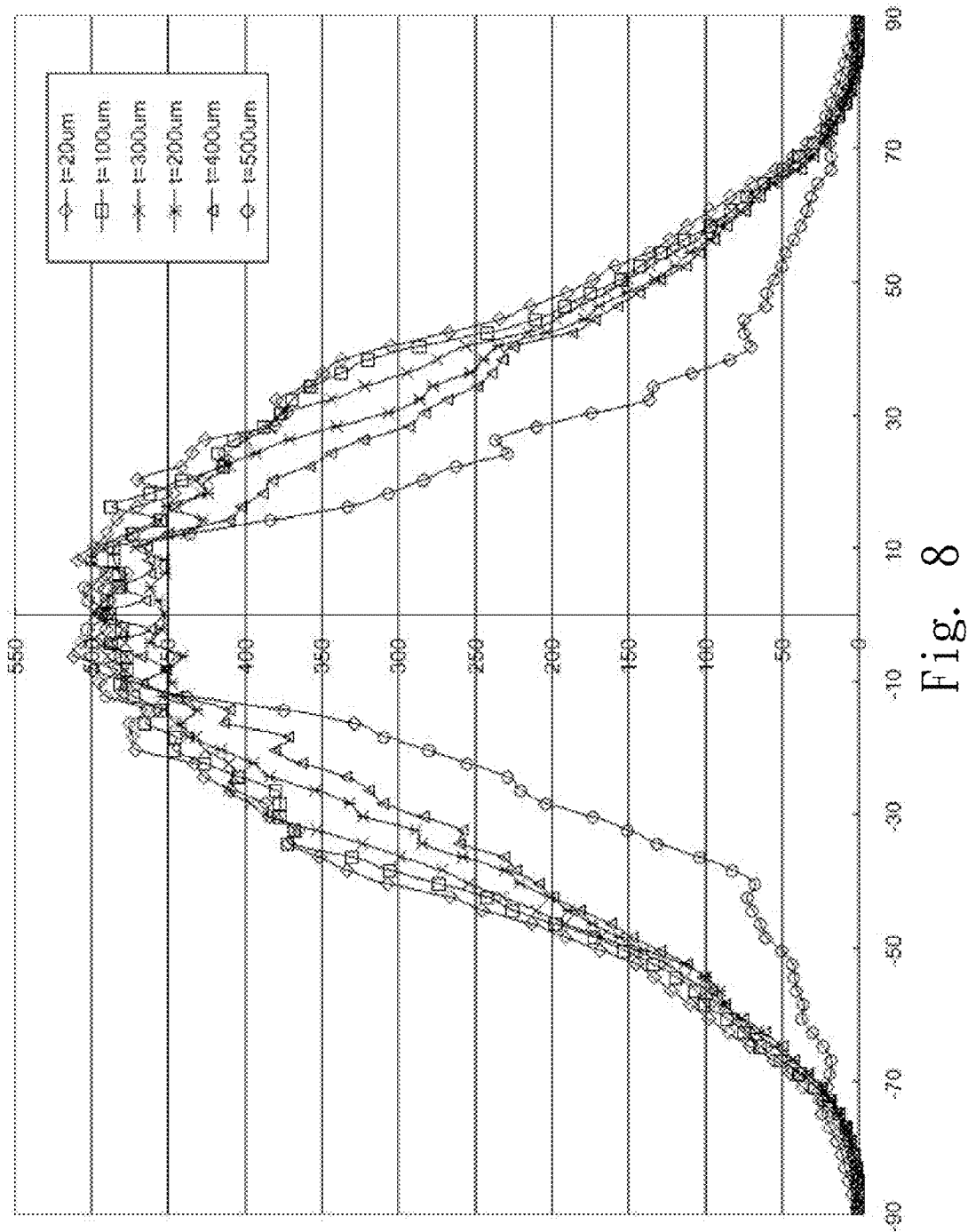
FIG. 8 shows optical performance of the optical sheet with different thickness of reflective structures.

When the structural features of the optical sheet satisfy the above equation, the intensity of light from the optical sheet is higher. As shown in FIG. 8, when the thickness of the optical sheet is between 20 μm~500 μm, the equation (2) will be satisfied, and the intensity of light will achieve 450~500 lux.

Figure 9:
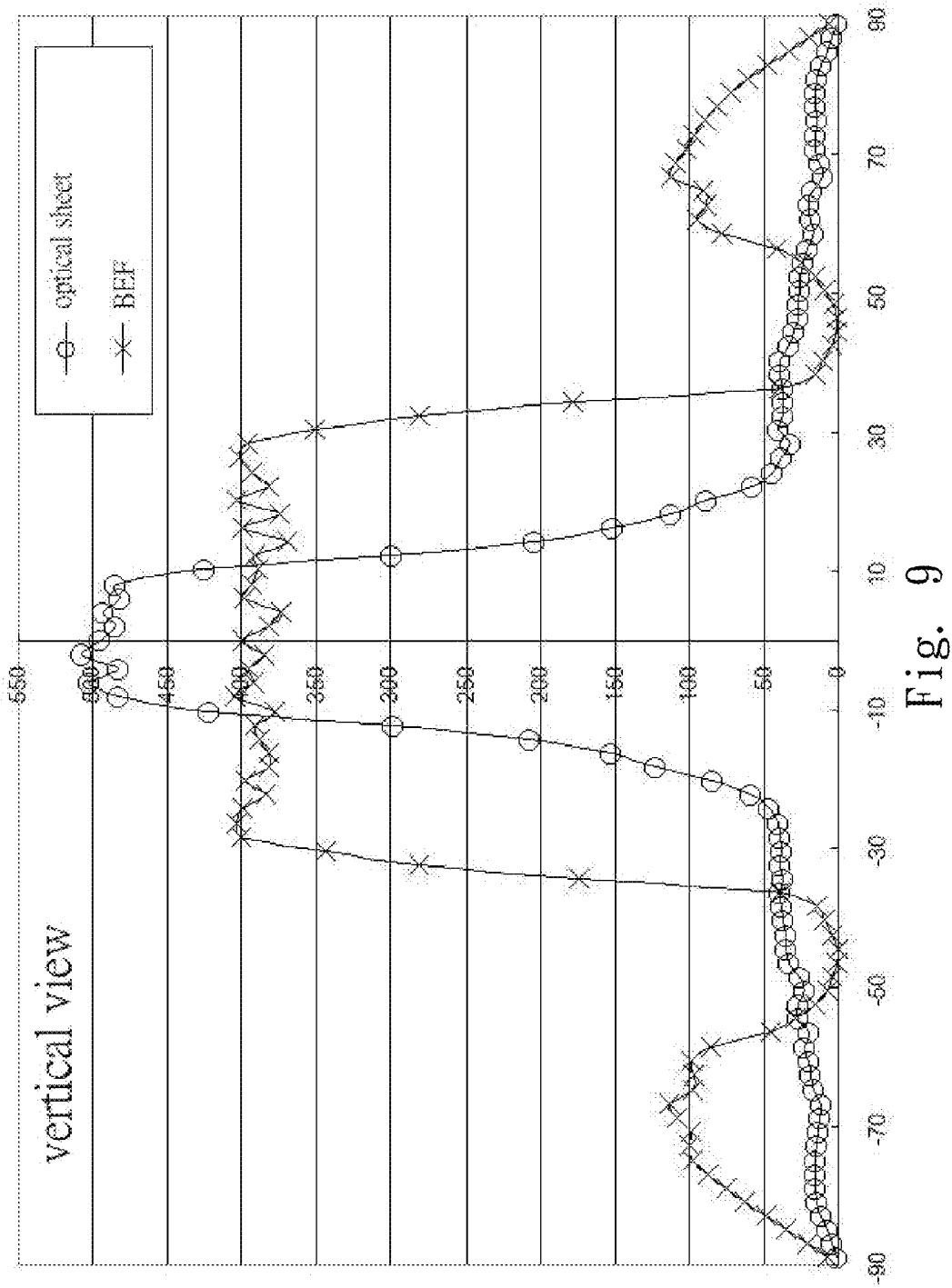
FIG. 9 shows the optical performance comparison between the optical sheet in the invention and the brightness enhancement film at the angle of vertical view.
Figure 10:
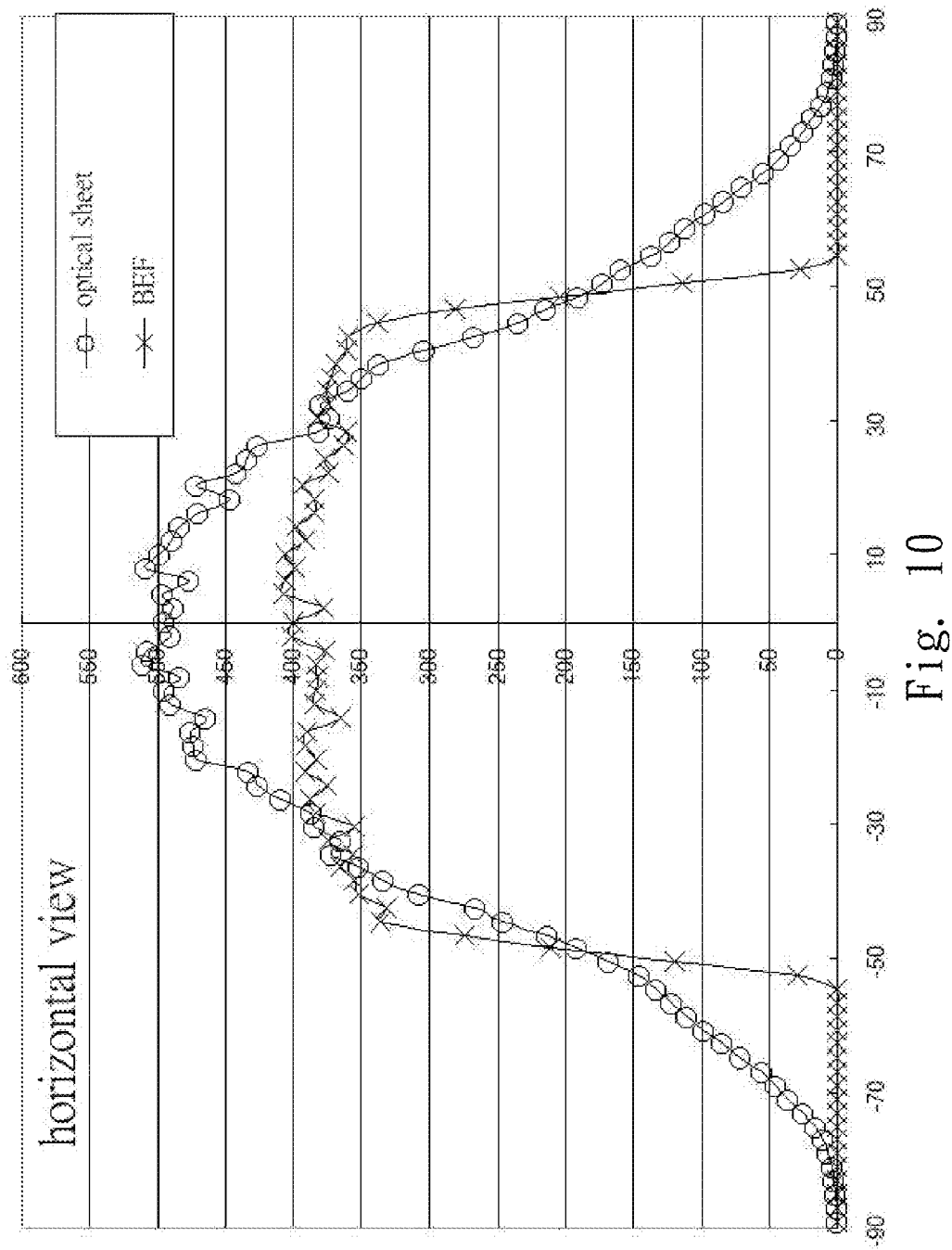
FIG. 10 shows the optical performance comparison between the optical sheet in the invention and the brightness enhancement film at the angle of horizontal view.

Please refer to FIG. 9 and FIG. 10, FIG. 9 shows the optical performance comparison between the optical sheet in the invention and the brightness enhancement film in the vertical view, and FIG. 10 shows the optical performance comparison between the optical sheet in the invention and the brightness enhancement film in the horizontal view. From FIG. 9 and FIG. 10, the skill in the art can clearly know the intensity of light from the optical sheet in the invention will be higher in the vertical view and horizontal view. Furthermore, the angle of horizontal view of the optical sheet in the invention is wider than the brightness enhancement film.

Figure 4:
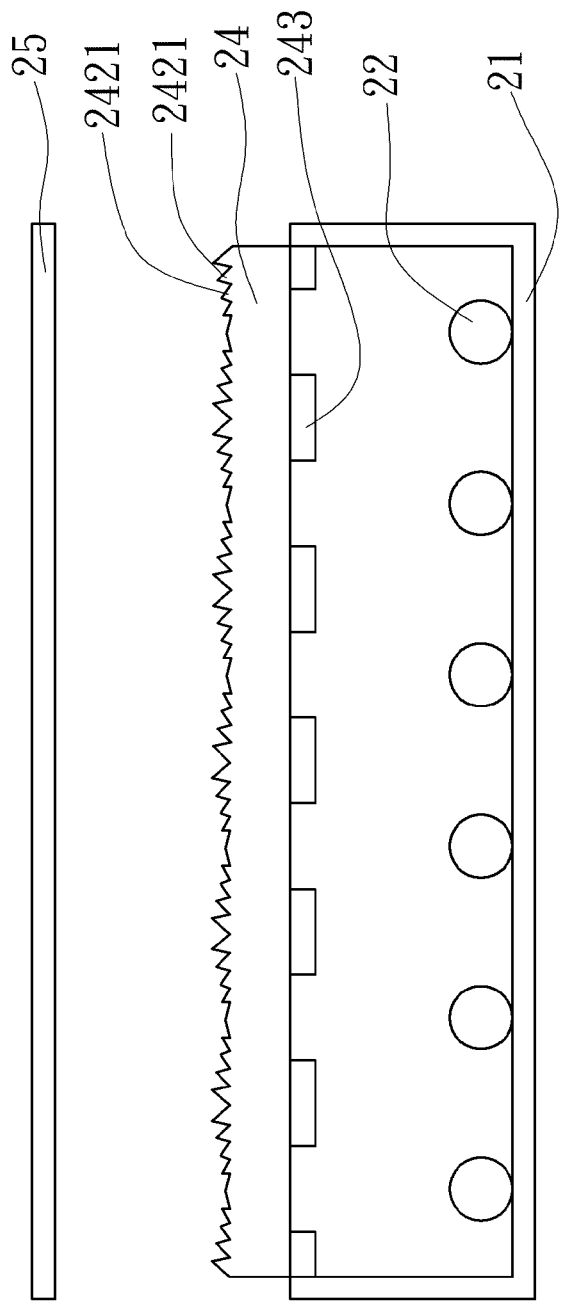
FIG. 4 shows a backlight assembly with the optical sheet in the invention.

A backlight assembly is disclosed in the following. Please refer to FIG. 2, FIG. 3A, and FIG. 4. FIG. 4 shows a backlight assembly with the optical sheet in the invention. As shown in FIG. 4, the backlight assembly includes a frame 21, a plurality of optical sources 22, an optical sheet 24, and an optical film 25. The frame is used to support the optical sheet 24 and receive the optical sources 22. The optical source 22 is a cold cathode fluorescent lamp, a light-emitting diode, a flat fluorescent lamp, an external electrode fluorescent lamp, and a hot cathode fluorescent lamp. The light emitted from the optical sources 22 is entered into the optical sheet through the spacing between the reflective structures 243. After being condensed by the Fresnel lens bodies 242, the light is emitted vertically from the emergent surface 241A, and then the passage of the light will be adjusted by the optical film 25.

Please refer to FIG. 3B, FIG. 3B shows the second embodiment of the Fresnel lens units of the optical sheet in the invention. As shown in FIG. 3B, the Fresnel lens units 342 include a plurality of Fresnel lens bodies 3421. Each Fresnel lens body 3421 has a first end 3421A and a second end 3421B. The second end 3421B is between two neighboring Fresnel lens bodies 3421. The first ends 3421A are arranged in a line. The height of the two neighboring second ends is different. The Fresnel lens units 342 in this embodiment can achieve the same capability as the Fresnel lens units 242.

A manufacturing method of the optical sheet will be described as follows. The manufacturing method includes the following steps. First, a transparent base with a upper surface and a under surface, a curing adhesive, a mold, and a plurality of reflective structures are provided. The mold can be a roller or a plane-type mold. The curing adhesive is UV curable resin or thermal-plastic resin. Then, the curing adhesive is coated on the upper surface. A plurality of the patterns is transferred into the curing adhesive in order to generate pluralities of Fresnel lenses. Finally, the reflective structures are combined on the under surface.

Another manufacturing method of the optical sheet will be described as follows. The manufacturing method includes the following steps. First, a transparent base with a upper surface and a under surface, a mold, and a plurality of reflective structures are provided. A plurality of the patterns is transferred into the transparent base in order to generate pluralities of Fresnel lenses on the upper surface of the transparent base. Finally, the reflective structures are combined on the under surface of the transparent base.

The foregoing, as well as additional objects, features and advantages of the invention will be more readily apparent from the following detailed description, which proceeds with reference to the accompanying drawings.

While the preferred embodiment of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

We claim:
1. An optical sheet, receiving an incident light from optical sources, comprising:
   a body, comprising an incident surface and an emergent surface, the incident surface receiving the incident light with an incident angle, wherein the refractive index of the body is $n_i$ and i is a positive integer;
   a plurality of reflective structures, placed on the body, wherein there is a spacing W between two neighboring reflective structures, in the direction of the incident light the thickness of the reflective structure is t; and a plurality of Fresnel lens units, having a width P, disposed on the emergent surface, each Fresnel lens corresponding to the spacing;
when the equation, $$\tan^{-1}\left[\frac{P^2}{6t}\right] > \sin^{-1}\sum_{i=1}^{j}\frac{1}{n_i}, j \geq 1,$$

is satisfied, the incident light passes through the spacing, the incident angle is adjusted by the thickness t and converged by the Fresnel lens units.

2. The optical sheet of claim 1, wherein the body is made of one of or made by stacking at least two of the following materials: polyethylene terephthalate, polycarbonate, tri-acetyl cellulose, polymethylmethacrylate, methylmethacrylate styrene, polystyrene, and cyclic olefin copolymer.

3. The optical sheet of claim 1, wherein each Fresnel lens unit further comprises a plurality of Fresnel lens bodies, each Fresnel lens body has a first end and a second end, the second end is between two neighboring Fresnel lens bodies, the second ends are arranged in a line, and the heights of the two neighboring second ends are different.

4. The optical sheet of claim 1, wherein the ratio of the spacing W and the width P is between 0.2 and 0.5.

5. The optical sheet of claim 1, wherein there is a distance T between the incident surface and the emergent surface, and the ratio of the distance T and the width P is between 0.8 and 1.2.

6. The optical sheet of claim 1, wherein the material of the reflective structure is titania, silica, or magnesia.

7. A manufacturing method of an optical sheet comprising:
providing a transparent base with a upper surface and a under surface, a curing adhesive, a mold, and a plurality of reflective structures;
coating the curing adhesive on the upper surface;
transferring a plurality of the patterns into the curing adhesive in order to generate pluralities of Fresnel lenses;
curing the Fresnel lenses on the curing adhesive; and
combining the reflective structures on the under surface.

8. The manufacturing method of an optical sheet of claim 7, wherein the material of the transparent base is made of one of or made by stacking at least two of the following materials: polyethylene terephthalate, polycarbonate, tri-acetyl cellulose, polymethylmethacrylate, methylmethacrylate styrene, polystyrene, and cyclic olefin copolymer.

9. The manufacturing method of an optical sheet of claim 7, wherein the curing adhesive is UV curable resin or thermalplastic resin.

10. The manufacturing method of an optical sheet of claim 7, wherein the mold is a roller or a plate-type mold.

11. The manufacturing method of an optical sheet of claim 7, wherein the method of combining the reflective structures is bonding method and screen printing method.

12. A manufacturing method of an optical sheet comprising:
providing a transparent base with a upper surface and a under surface, a mold, and a plurality of reflective structures;
transferring a plurality of the patterns into the transparent base in order to generate pluralities of Fresnel lenses on the upper surface of the transparent base;
combining the reflective structures on the under surface of the transparent base.

13. The manufacturing method of an optical sheet of claim 12, wherein the material of the transparent base is made of one of or made by stacking at least two of the following materials: polyethylene terephthalate, polycarbonate, tri-acetyl cellulose, polymethylmethacrylate, methylmethacrylate styrene, polystyrene, and cyclic olefin copolymer.

14. The manufacturing method of an optical sheet of claim 12, wherein the mold is a roller or a plate-type mold.

15. The manufacturing method of an optical sheet of claim 12, wherein the method of combining the reflective structures is bonding method and screen printing method.

16. A backlight assembly comprising:
a plurality of light sources, generating incident light;
an optical sheet, receiving the incident light from light sources, comprising:
a body, comprising an incident surface and an emergent surface, the incident surface receiving the incident light with an incident angle, wherein the refractive index of the body is $n_i$ and i is a positive integer;
a plurality of reflective structures, placed on the body, wherein there is a spacing W between two neighboring reflective structures, in the direction of the incident light the thickness of the reflective structure is t; and
a plurality of Fresnel lenses, disposed on the emergent surface, having a width P, each Fresnel lens corresponding to the spacing, wherein the equation $$\tan^{-1}\left[\frac{P^2}{6t}\right] > \sin^{-1}\sum_{i=1}^{j}\frac{1}{n_i}, j \geq 1,$$

is satisfied, the incident light passes through the spacing, the incident angle is adjusted by the thickness t and converged by the Fresnel lenses;
an optical film, comparing to the optical source, placed on the other side of the optical sheet, used for adjusting the passage of the incident light.

17. The backlight assembly of claim 16, wherein the light source is a cold cathode fluorescent lamp, a light-emitting diode, a flat fluorescent lamp, an external electrode fluorescent lamp, or a hot cathode fluorescent lamp.

* * * * *